(12) United States Patent
Shetty et al.

(10) Patent No.: US 7,039,764 B1
(45) Date of Patent: May 2, 2006

(54) NEAR-PERFECT, FIXED-TIME SEARCHING ALGORITHM USING HASHING, LRU AND CAM-BASED CACHING

(75) Inventors: Suhas Shetty, San Jose, CA (US); De Vu, Fremont, CA (US)

(73) Assignee: Nokia Corporation, Espoo (FI)

( * ) Notice: Subject to any disclaimer, the term of this patent is extended or adjusted under 35 U.S.C. 154(b) by 737 days.

(21) Appl. No.: 10/052,718

(22) Filed: Jan. 17, 2002

(51) Int. Cl.
*G06F 12/00* (2006.01)

(52) U.S. Cl. ..................................... 711/133
(58) Field of Classification Search ............... 707/234, 707/238; 711/133, 168
See application file for complete search history.

(56) References Cited

U.S. PATENT DOCUMENTS

| | | | | |
|---|---|---|---|---|
| 5,043,885 | A * | 8/1991 | Robinson ..................... | 711/133 |
| 5,359,720 | A * | 10/1994 | Tamura et al. .............. | 711/108 |
| 5,414,704 | A * | 5/1995 | Spinney ...................... | 370/389 |
| 5,530,834 | A | 6/1996 | Colloff et al. | |
| 5,566,324 | A * | 10/1996 | Kass .......................... | 711/160 |
| 5,829,051 | A * | 10/1998 | Steely et al. ............... | 711/216 |
| 5,893,120 | A * | 4/1999 | Nemes ....................... | 707/206 |
| 5,914,938 | A | 6/1999 | Brady et al. | |
| 6,012,126 | A * | 1/2000 | Aggarwal et al. .......... | 711/133 |
| 6,052,698 | A | 4/2000 | Bennett et al. | |
| 6,081,530 | A * | 6/2000 | Wiher et al. .............. | 370/395.53 |
| 6,115,705 | A * | 9/2000 | Larson ....................... | 707/3 |
| 6,658,533 | B1 * | 12/2003 | Bogin et al. ................ | 711/135 |
| 6,683,887 | B1 * | 1/2004 | Huang et al. ............... | 370/466 |
| 6,735,670 | B1 * | 5/2004 | Bronstein et al. .......... | 711/108 |
| 6,772,224 | B1 * | 8/2004 | Kung et al. ................ | 709/238 |
| 6,781,981 | B1 * | 8/2004 | Kimbrough ................ | 370/352 |
| 2002/0152361 | A1 * | 10/2002 | Dean et al. ................ | 711/160 |
| 2004/0186862 | A1 * | 9/2004 | Garthwaite ................ | 707/206 |

OTHER PUBLICATIONS

Jouppi, "Improving Direct-Mapped Cache Performance by the Addition of Small Fully-Associated Cache and Prefetch Buffers", Computer Architecture, 1990. Proceedings. 17th Annual International Symposium on , May 28-31, 1990 pp.:364-373.*

Xu et al., "A novel cache architecture to support layer-four packet classification at memory access speeds", INFOCOM 2000. IEEE ,vol.: 3 , Mar. 26-30, 2000 pp.:1445-1454 vol. 3.*

Takenaka et al., "Adaptive load balancing content address hashing routing for reverse proxy servers", Communications, 2004 IEEE International Conference on ,vol.: 3 , Jun. 20-24, 2004 □□pp.:1522-1526 vol. 3.*

(Continued)

*Primary Examiner*—Mano Padmanabhan
*Assistant Examiner*—Paul Baker
(74) *Attorney, Agent, or Firm*—Squire, Sanders & Dempsey L.L.P.

(57) ABSTRACT

A method and a search engine are described. A unique key is received. A hash is searched for a match to the unique key. Concurrently with searching the hash, a cache is searched for the match to the unique key. And information regarding the unique key is obtained.

62 Claims, 3 Drawing Sheets

OTHER PUBLICATIONS

Pagh, "Hash and Displace: Efficient Evalutation of Minimal Perfect Hash Functions", 1999, pp. 1-10.*

Czech et al., "An Optimal Algorithm for Generating Minimal Perfect Hash Functions" 1992, Information Processing Letters, 43(5):257-264.*

Cormack et al., "Practical Perfect Hashing", 1985 The COmputer Journal, vol. 28 No 1, pp. 54-58.*

Horowitz et al, "Fundamentals of Data Structures in C", 1993, Computers Science Press, p. 406-409.*

Graham et al., "Pseudochaining in Hash Tables", 1978, Communications of the ACM 21(7), p. 554-557.*

Brent, "Reducing the Retrieval Time of Scatter Storage Techniques", 1973, Communications of the ACM 16(2), p. 105-109.*

Fox et al., "Order Preserving Minimal Perfect Hash Functions and Information Retrieval", 1991, ACM Transactions on Information Systems 9(3), p. 279-301.*

Munro et al., "Techniques for collision resolution in hash tables with open addressing", 1986, Proceedings of 1986 ACM Fall joint computer conference, p. 601-610.*

Cormack, et al. "Practical Perfect Hashing" The Computer Journal, vol. 28, No. 1, 1985, pp. 54-58.

Pagh, "Hash and Displace: Efficient Evaluation of Minimal Perfect Hash Functions", BRICS Report Series, 1999 pp. 1-10, Department of Computer Science, University of Aarhus, Denmark.

* cited by examiner

NEAR-PERFECT, FIXED-TIME SEARCHING ALGORITHM USING HASHING, LRU AND CAM-BASED CACHING

FIELD OF THE INVENTION

This invention relates to the field of search engines and, in particular, to search engines capable of identifying a subscriber associated with a data packet.

BACKGROUND

Subscriber management routers (SMR) are Internet Protocol (IP) routers that provide per-subscriber services, such as Network Address Translation (NAT) and firewall services. These services are sometimes referred to as "high touch", because they require that the router examine and manipulate many fields in the IP and higher layer headers. These services are also stateful, and require that the SMR maintain states about packet flows of individual subscribers. Such stateful "high touch" services are process intensive, and cannot be done at line speeds in hardware. As a result, typical SMR architectures consist of line cards and data cards. The primary function of a line card is to dispatch packets received on a given interface to a data card that has the appropriate flow state, and is therefore capable of processing the packet. Upon receiving a packet, the data card first identifies the subscriber, then identifies the individual flow, then processes the packet accordingly.

Because the line card does a limited amount of work, it can operate in hardware at line speeds. The software-based data cards are more numerous, and so individually do not need to operate at line speeds. If the line card is able to perform additional functions, then it may further offload the data card. One such function is identification of the subscriber associated with a given packet.

In order to identify the subscriber, the line card extracts certain fields from the incoming packet and generates a key that is unique for every subscriber. This key is then used to search memory for the entry that identifies the subscriber and the appropriate data card.

The line cards of large-capacity SMRs in mobile wireless environments have new and difficult requirements placed on them. As already mentioned, they must operate at line speeds, which requires a hardware-based implementation with an ability to search memory in a fixed amount of time. Subscriber entries are added and deleted frequently, as mobile subscribers come and go. The addition and deletion of entries must therefore operate quickly. In addition, each line card may handle a very large number of subscribers, on the order of one million.

The unique search key generated from the packet fields must be at least 64 bits in length. One reason is that the identifier field of the IPv6 header is 64 bits. Clearly, a 64 bit search key cannot be used as a direct index into Random Access Memory (RAM), as this would require $2^{64}$ RAM entries (or, 18 giga-giga-entries).

One solution is to use a Content Addressable Memory (CAM) based search engine. A CAM based search engine operates quickly in deterministic time, and additions and deletions are simple and fast. However, a CAM is extremely expensive and takes up a lot of space on the line card, and so may not be a feasible solution.

Another solution utilizes a RAM based search engine with a hash table. In a standard hashing scheme, a search key K1 of a fixed length (L1) is presented to a universal hashing process. The search key is hashed using a universal hash function to generate a bucket ID having a second length, smaller than the first length L1. The bucket ID is used to address a primary hash table stored in a memory, and a data containing a key (of length L1) and two pointers (P1 and P2) are retrieved from an associated storage location.

The key retrieved from the hash table location data is compared with the search key, if a match is found, the pointer P1 points to a table containing entries for the search key K1.

If a match is not found, then P2 is used as an index to read another entry from the linked hash table; to retrieve a data containing a key (of length L1) and two pointers (P1 and P2) are retrieved from an associated storage location. The same process as described in this step is repeated until a match is found.

In a Dynamic Random Access Memory (DRAM) based solution it is good to have a burst read operation; because a read is usually associated with latency. If we do only single reads per access, the latency would consume most of the bandwidth available. So the standard hash described above would not work well in a DRAM based memory solution.

The number of hash table entries are generally 4 or 8 times more than the number of entries need to be found. For example, if there are 1 million entries to be searched, then the typical hash table would contain about 4 Million to 8 million entries. Thus, a Static Random Access Memory (SRAM) based solution is prohibitively expensive.

U.S. Pat. No. 5,914,938 teaches a method whereby each bucket contains N locations instead of just one. Each location contains a key/pointer entry, so that a single burst memory read obtains N entries matching a given bucket ID rather than just one. However, it is possible for an overflow to occur—that is, more than N entries have a given bucket ID. To prevent overflows, U.S. Pat. No. 5,914,938 teaches that in the event of an overflow, different hash functions are tried until a "perfect" hash function is found that has no overflows. This is possible in the LAN switching environment for which U.S. Pat. No. 5,914,938 was designed, because the addition and deletion of new entries is relatively infrequent. In the large-scale SMR environment, however, additions and deletions are too frequent to rehash all entries.

U.S. Pat. No. 6,052,698 and U.S. Pat. No. 5,530,834 teach the use of caches to speed up the average search time. The cache is smaller and faster than the main memory. Entries are stored in the cache when they are used. When the cache is full, the least-recently used (LRU) entries are overwritten. U.S. Pat. No. 6,052,698 is designed to take advantage of the caches within processors such as the PENTIUM processor, which does not apply to hardware-based approaches. In addition, the U.S. Pat. No. 5,530,834 teaches that the RAM itself is the cache memory and main memory is slower.

SUMMARY OF THE INVENTION

The present invention pertains to method and apparatus for a search engine. In one embodiment, the method may comprise receiving a unique key. A hash may be searched for the match to the unique key. A cache may be searched for the match to the unique key concurrently with the searching the hash for the match to the unique key. Information regarding the unique key may be obtained.

Additional features and advantages of the present invention will be apparent from accompanying drawings and from the detailed description that follows.

BRIEF DESCRIPTION OF THE DRAWINGS

The features and advantages of the invention will be understood by reading the following description in conjunction with the drawings, where.

DETAILED DESCRIPTION

In the following description, numerous specific details are set forth in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

It will be appreciated that the term "coupled", as used herein, means connected directly or connected through one or more intervening components or circuits.

A method for searching for a subscriber corresponding to a particular data packet is described. More specifically, the present invention describes a method of utilizing hashing to determine the subscriber.

Network-Based Technology

As indicated above one embodiment of the invention may determine a subscriber corresponding to a particular data packet that may be transmitted via a network. Accordingly, some introduction to network-based technology may be helpful in understanding certain aspects of the invention. In addition, embodiments of the invention utilize different types of memory devices, introduction to which may also be helpful in understanding the invention.

One embodiment of the invention utilizes routers. A router is a device that connects any number of local area networks and determines the next network point to which a data packet should be forwarded toward its destination. A router may create and maintain a table of available routers and their conditions and use this information along with distance and cost algorithms to determine the best router for a given packet. Typically, a data packet may pass through several routers prior to reaching its destination.

One embodiment of the invention utilizes Content Addressable Memory CAM). In CAM data is accessed via a key that contains a portion of the desired contents or entire contents desired from a particular memory cell in the CAM. The CAM is provided with a key and an instruction by a processor to search for a match to the provided key in CAM's memory array. The CAM simultaneously searches all the entries of the memory array and compares each entry to the provided key in order to locate a match. Upon finding a match to the provided key the CAM device asserts a match flag.

Another embodiment of the invention utilizes Static Random Access memory (SRAM) and Dynamic Random Access Memory (DRAM). SRAM is a random access memory that retains data bits in its memory as long as power is being supplied. Unlike DRAM, which stores bits in cells consisting of a capacitor and a transistor and needs to have its storage cells refreshed every few milliseconds, SRAM does not have to be periodically refreshed. SRAM stores data in a flip-flop consisting of normal logic transistors and provides faster access to data than DRAM.

One embodiment of the invention utilizes Synchronous Dynamic Random Access Memory (SDRAM). SDRAM is DRAM that is synchronized with a clock speed of a microprocessor that it is optimized for. The synchronization of the DRAM with the clock speed of the microprocessor tends to increase a number of instruction that a processor can perform in a given time.

Exemplary Architecture

Figure 1:
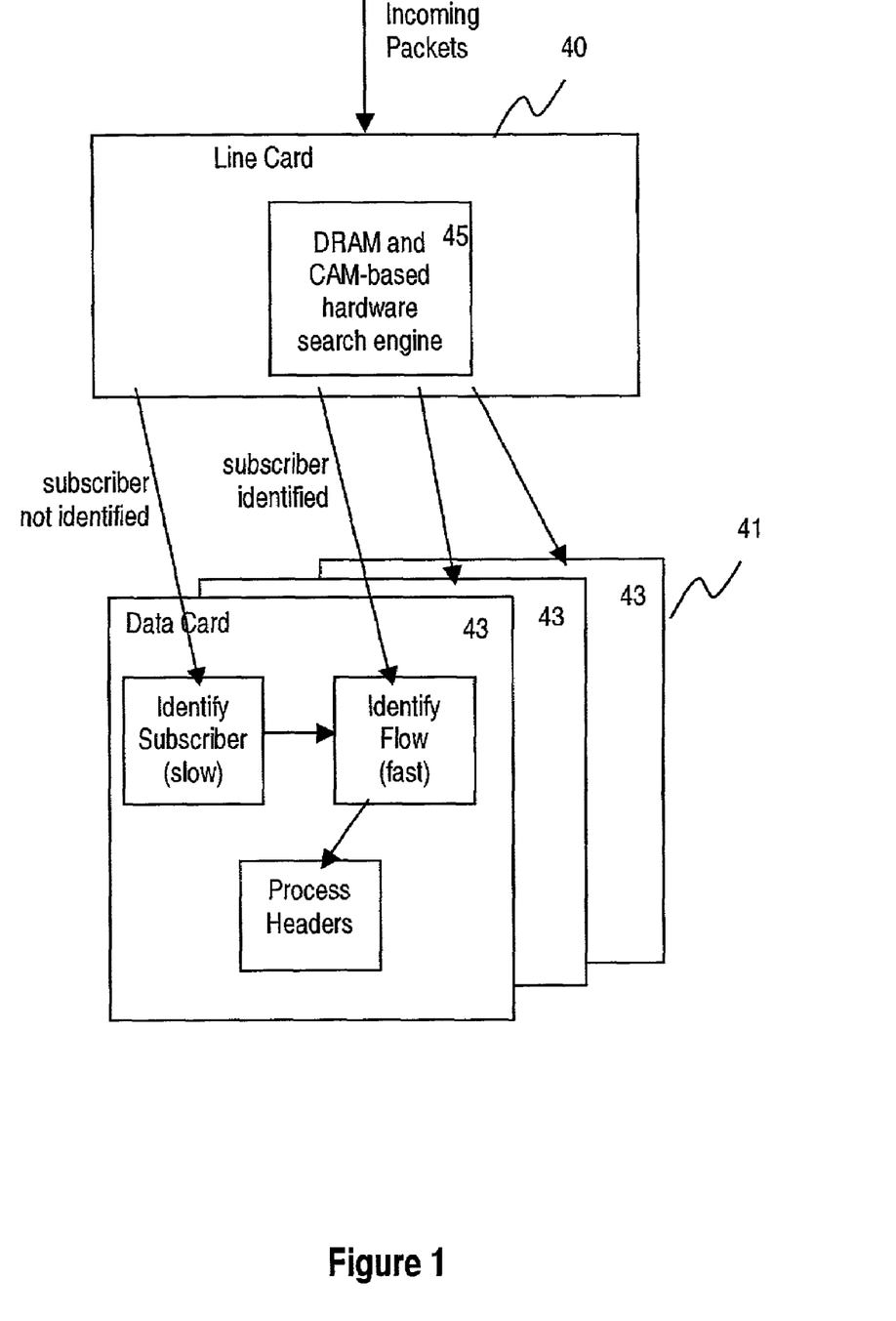
FIG. 1 illustrates packet flows between line and data cards in a Subscriber Management Router (SMR) according to one embodiment of the invention.

FIG. 1 shows a card-level processing of packets in an SMR according to one embodiment of the invention. Packets may enter a line card 40 and be dispatched to a set of data cards 41. Because each data card 43 may handle a subset of all the subscribers, the line card 40 may need to determine which data card is appropriate for a given packet. The line card 40 may also identify a subscriber associated with the given packet by utilizing a hardware search engine 45. In one embodiment, the data card 43 may identify the subscriber, at a slow speed, and perform backup identifications of subscribers if line card searching process fails.

Search Engine Scheme

In the following description, it is assumed that a search processor is part of a networking sub system, however it will be appreciated that it is not necessary for the search processor to be part of a networking sub system and a generic processor may be utilized in implementation of the invention.

Figure 2:
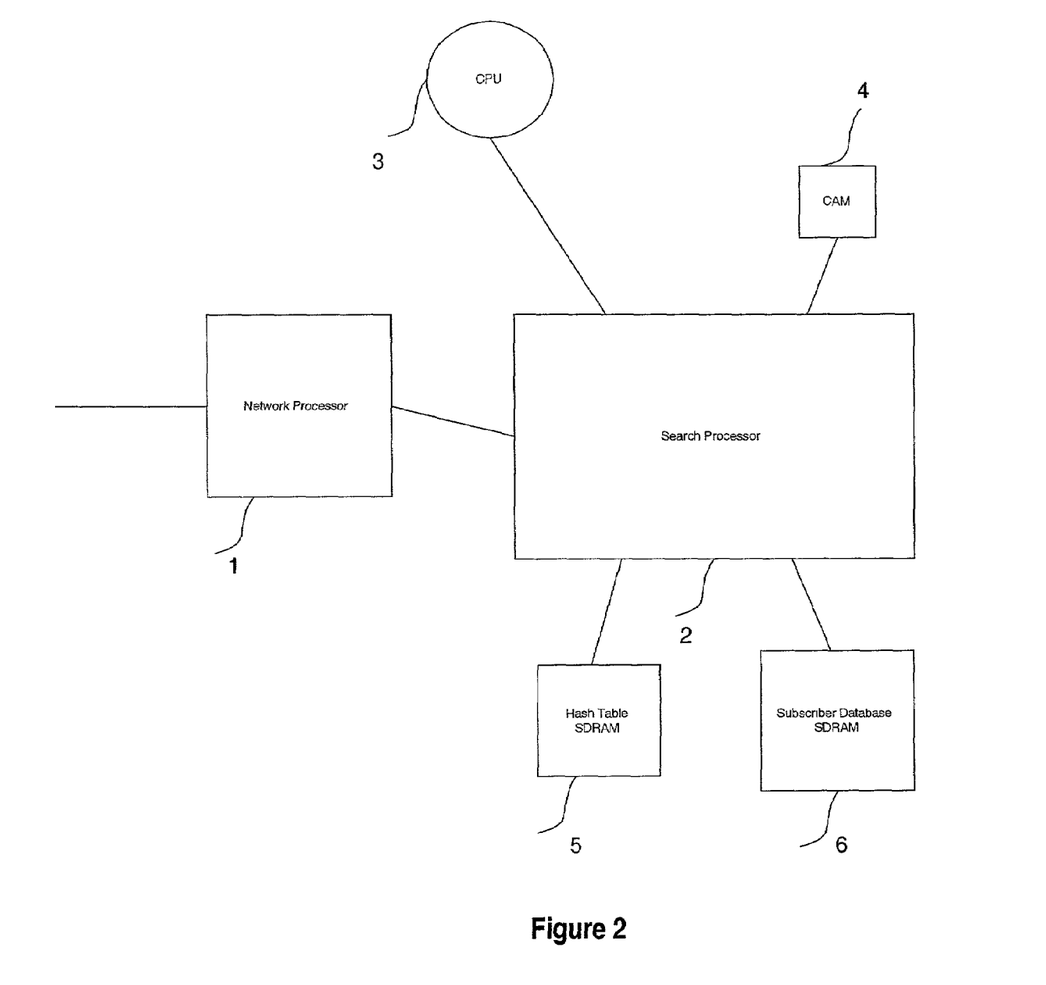
FIG. 2 is a system level diagram of a line card processing according to one embodiment of the invention.

FIG. 2 illustrates various components of a search engine scheme according to one embodiment. A Network Processor 1 may receive packets from a physical interface, such as Asynchronous Transfer Mode (ATM) or Ethernet. It will be appreciated that the Network Processor 1 may be one or more network processor units (NPUs), microprocessors, or one or more special purpose processors such as a digital signal processor (DSP). In addition, the Network Processor 1 may be another type of controller, for example, a field programmable gate array or a general purpose processor. In one embodiment the Network Processor 1 may process the packets and form a unique Key K1 of fixed length. This key is sent by the Network Processor 1 to a Search Processor 2. In one embodiment, a Hash Table Synchronous Dynamic Random Access Memory (SDRAM) 5 may constitute a B number of buckets. Each bucket may in turn contain N locations. In one embodiment each location may be used for storing the Key K1 and an address to a Subscriber Database SDRAM 6, generated by a CPU 3 and located on a line card 40. The Subscriber Database SDRAM 6 may include information such as a data card corresponding to each subscriber. In one embodiment the SDRAM may be 3.3V Single Data Rate (SDR) SDRAM manufactured by the Integrated Silicon Solution, Inc. (Santa Clara, Calif.).

In one embodiment of the invention, the CPU 3 may be responsible for making an entry into a location in the Hash Table 5. In one embodiment when the CPU 3 needs to make an entry into the Hash table 5, it may present the Search Processor 2 with the unique key K1 of Length L1, and an address, which points to a location in the Subscriber Database 6, containing information regarding the unique key K1. The K1 key may be passed into a Hashing Unit 27, shown in FIG. 3, located within the Search Processor 2 according to one embodiment. The Hashing Unit 27 may output an address of a bucket of the Hash Table 5, constituting a location where the entry should be made. The Search Processor 2 may read the N locations from the bucket, find out the appropriate location where the entry (based on empty location or Least Recently Used (LRU) algorithm) may be made and write the key K1 of length L1 presented by the CPU 3. In one embodiment the Search Processor 2 may mark the location valid and also write the address of the location of the subscriber database that contains information regarding the key.

In one embodiment a CAM 4, utilized as a cache, may be used as an overflow block when there are more than N keys that hash into the same bucket. The CAM 4 may store up to X number of entries. In one embodiment the X value may depend on a normal key size, hash key size (space), organization of hash table, etc. For example, for a searching scheme of 72-bit keys that may be hashed down to 21-bit hashed-key, with 1 million buckets of 4 entries each, the effective X value would be about 50K entries. In one embodiment the value of X may be determined utilizing probability studies and/or simulation well known in the art. In one embodiment the CAM 4 may be a CAM from the Netlogic Microsystems Chorus or Harmony Ternary CAM product families manufactured by Music Semiconductors, Inc. (San Jose, Calif.).

In one embodiment the Search Processor 2 may be responsible for using an LRU algorithm to determine which of the entries should be written into the CAM 4. The Search Processor 2 may also be responsible for using an ageing functionality, to age entries from the CAM 4 and to inform the CPU 3 upon an entry being aged. It will be appreciated that the operations of the Network Processor 1 and the Search Processor 2, described in detail below, may be integrated within a common processor.

Figure 3:
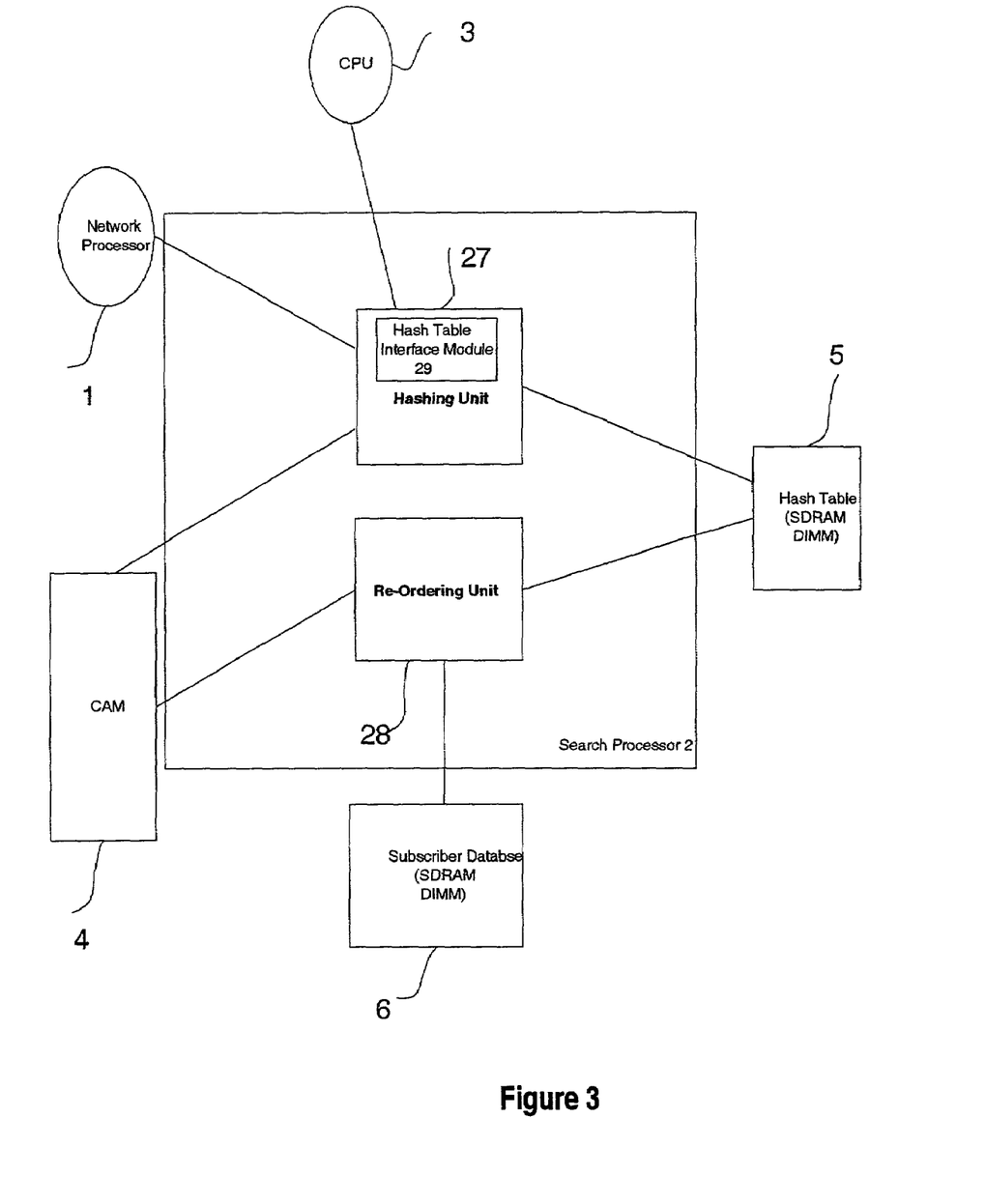
FIG. 3 illustrates components of a search processor located on a line card according to one embodiment of the invention.

In one embodiment upon the Network Processor 1 sending a key K1 to be looked up, the Search Processor 2 sends the key K1 to the Hashing Unit 27 of FIG. 3 and utilizes the output of the Hashing Unit 27, containing an appropriate bucket, to lookup N locations from the bucket in the Hash Table memory 25. In one embodiment a key stored in each of the N locations is compared with the key K1. If a match is found then the Search Processor 2 may access the Subscriber Database 6 utilizing the addresses retrieved from the location containing the matching key. Concurrently the Search Processor 2 may also perform a look up operation to determine if the key K1 is stored in the CAM 4. In one embodiment the Search Processor 2 may concurrently perform the lookup operation for the key K1 in the Hash Table memory 25 and the lookup operation for the key K1 in the CAM 4 by performing both lookup operations at approximately the same time, i.e. by starting both lookup operations prior to the end of either lookup operation.

In one embodiment if a match is not found in the Hash Table 5, but located in the CAM 4, then the location in the CAM 4 containing the matching key includes an address, which points to the location in the Subscriber Database 6 that contains information about the subscriber corresponding to the key.

The following is a detailed description of processes of creating a new entry and deleting an existing entry, the search process and the aging process. In one embodiment of the invention, the unique key K1 is 72 bits long and the number of locations per hash bucket is 4. In addition, the Hash Unit 27 generates a 21 bit hash table index. It will be appreciated that the present invention is not limited to this exemplary scheme.

Adding a New Entry

In one embodiment when a new subscriber entry needs to be made, the CPU 3 of FIG. 2 may insert the new entry into the Subscriber Database 6 at an empty location. The CPU 3 may then give the Search Processor 2 a 72-bit key and the Subscriber Database 6 index (where the entry was made) to program it in the appropriate bucket of the Hash Table 5. The Hashing Unit 27 may hash the key and obtain a hash table index.

In one embodiment if not all the locations in the bucket are occupied, the CPU 3 may direct a Re-ordering Unit 28 of FIG. 3 to reorder the entries by inserting the new key entry into the first location in the bucket. For example, if there were valid entries present in location 1 and location 2 prior to the addition of the new key entry, then at the completion of the reordering operation by the Re-ordering Unit 28, the new entry will occupy location 1, the entry that used to occupy location 1 will move to location 2 and the entry of location 2 will be stored in location 3.

In one embodiment, if all the locations of the bucket are occupied, the Re-ordering Unit 28 will insert the new entry into the location 1. The entry that was occupying location 1 will be moved to location 2, location 2's entry will move to location 3, location 3's entry to location 4. In one embodiment, the entry that occupied location 4 may be written to the CAM 4 along with a timestamp that is used to age CAM entries, as described below.

Deleting an Entry

In one embodiment of the invention, the CPU 3 may provide the Search Processor 2 with a key to be removed. A Hash Table Interface Module 29 of FIG. 3 may hash the provided key to determine a hash table index. In one embodiment upon reading every entry from the corresponding bucket, the Hash Unit Interface Module 29 may compare the key stored at a particular location to the key to be deleted. In one embodiment, if a match is found, then that entry is deleted and the Re-ordering Unit 28 may reorder the remaining entries. For example, if the matching key was found at location 3 of the bucket, then the entries at locations 1 and 2 are not reordered, and the entry at location 4 may be moved to location 3, with location 4 being declared invalid.

Concurrently with searching the hash table, the Search Processor 2 may look up the provided key in the CAM 4. Upon finding the entry, the Search Processor 2 may remove the entry from the CAM 4.

Search Process

In one embodiment of the invention, the Network Processor 1 may send a 72-bit key to the Search Processor 2. The Hashing Unit 27 of FIG. 3 may hash the 72-bit key to a 21-bit hash table index that references a bucket in the Hash Table 5. The Search Processor 2 may access all the locations in that bucket and compare the key provided by the Network Processor 1 to the key stored at in every location. In one embodiment if a match is found then the matched location may contain an address pointing to a location in the Subscriber Database 6 of FIG. 3, which contains the information regarding the key, e.g. a corresponding subscriber. In one embodiment, if the match was found then the Re-ordering Unit 28 may reorder the entries of the bucket with the matched entry being moved to location 1. For example, if the matched location was in location 3, then upon the Re-ordering Unit 28 reordering the entries, the matching entry may occupy location 1, the location 1 entry may be moved to location 2, and the location 2 entry to location 3 of the bucket. In one embodiment an entry in location 4 remains unchanged.

In one embodiment, the Search Processor 2, utilizing the 72-bit key, performs a search of the CAM 4 in parallel of searching the Hash Table 5. In one embodiment if a match is found in the CAM 4, then location of the matched entry in the CAM 4 may contain an address, which points to a location in the Subscriber Database 6, containing information regarding the key.

In one embodiment of the invention, if the match was found in the CAM 4 and all the locations of a hash table bucket are occupied, then the contents of the matched location of the CAM 4 are copied into location 1 of the bucket. In one embodiment the entry in location 1 is moved to location 2 by the Re-ordering Unit 28, the contents of location 2 are moved to location 3, the contents of location 3 are moved to location 4, and the entry at the location 4 may be moved to the CAM 4 along with a timestamp used to age the entry from the CAM 4.

In one embodiment if the bucket contains invalid locations, then the contents of the matched location in the CAM 4 are moved to location 1 of the bucket and the other entries are reordered by the Re-ordering Unit 28. For example, the entry at location 1 may move to location 2, entry from location 2 may move to location 3, and location 4 may remain invalid.

In one embodiment all the locations in a particular bucket are reordered within a single packet time.

Ageing Process

In one embodiment of the invention, the Search Processor 2 may be responsible for ageing entries from the CAM 4 to ensure that the CAM 4 does not overflow. In one embodiment entries that are rarely searched may be deleted. If a subsequent search of a deleted entry occurs, the CPU 3 may re-insert the deleted entry into the hash table upon receiving notification of the failure.

In one embodiment entries are aged from the CAM 4 as a background activity. In one embodiment the ageing operations may be performed when there are no packets to process, or when a packet is longer than the minimum length resulting in extra processing cycles during the packet arrival, or when there is an available processing cycle when there is no need to switch entries between the Hash Table 5 and the CAM 4.

In one embodiment of the invention every entry added to the CAM 4 may be associated with a 16-bit timestamp. It will be appreciated that the length of the timestamp is not limited to 16 bits. A timestamp may be incremented every second, and wrapped around to 0 when the value of the timestamp reaches a predetermined maximum value. In order to facilitate the deletion process, a Time variable set to the next timestamp, which corresponding entry should be deleted from the cache, may be maintained. The variable may initially be set to be one less than the timestamp. A Total Entries variable representing a number of total entries in the CAM 4 may also be maintained. In one embodiment, it may be initially set to 0 and incremented every time a new entry is added to the CAM 4 and decremented every time an entry is deleted from the CAM 4.

In one embodiment, whenever the search engine has a spare cycle, it may determine if it should attempt a CAM delete. If either a total number of CAM 4 entries, the Total Entries variable, is above a predetermined threshold that is near the CAM 4 capacity, or if a timestamp of an entry is nearing the value of the Time variable then the Search Processor 2 may attempt to delete the entry.

In one embodiment the Search Processor 2 may search the CAM 4 for an entry with a timestamp equal to the Time variable. If such an entry is found, then the entry is deleted and the value of the Time variable remains unchanged. In one embodiment, if such an entry is not found, then the Time variable may be incremented, unless the value of the Time variable is one less than the timestamp, in which case it may not be incremented.

It will be appreciated that the above-described search engine may be implemented in hardware or software, or by a combination of hardware and software. In one embodiment, the above-described search engine may be provided in a machine-readable medium. The machine-readable medium may include any mechanism that provides information in a form readable by a machine, e.g. a computer. For example, a machine-readable medium may include read only memory (ROM); random access memory (RAM), magnetic disk storage media; optical storage media; flash memory devices; electrical, optical, acoustical or other form of propagated signals (e.g., carrier waves, infrared signals, digital signals, etc.); etc.

In addition it will be appreciated that the above-described invention is not limited to SMRs, and my be utilized in any field requiring a near-perfect fixed-time search engine.

In the foregoing specification, the invention has been described with reference to specific exemplary embodiments thereof. It will, however, be evident that various modifications and changes may be made thereto without departing from the broader spirit and scope of the invention as set forth in the appended claims. For example, the operations of the illustrated components of the figures may be performed by separate circuits or incorporated within larger circuit blocks. The specification and drawings are, accordingly, to be regarded in an illustrative rather than a restrictive sense.

What is claimed is:

1. A method comprising:
   receiving a unique key;
   searching a hash for a match to the unique key;
   searching a cache for the match to the unique key concurrently with the searching the hash for the match to the unique key; and
   obtaining information regarding the unique key wherein the cache comprises least recently used keys.

2. The method of claim 1 wherein the unique key is associated with a subscriber of a data packet.

3. The method of claim 1 wherein the hash comprises buckets, each bucket comprising a plurality of locations.

4. The method of claim 3 wherein a first location in the bucket comprises a most recent key.

5. The method of claim 4 wherein the most recent key is a most recently searched key.

6. The method of claim 4 wherein the most recent key is a last added key.

7. A method comprising:
   rotating entries stored in a plurality of locations of a hash bucket to empty a first location; and
   adding a key to the first location of the plurality of locations of the hash bucket; and
   moving an entry from a last location to a cache;
   wherein the rotating the entries comprises moving an entry from a location to a next location of the plurality of locations.

8. The method of claim 7 further comprising assigning a timestamp to the entry from the last location.

9. The method of claim 8 further comprising removing an oldest entry from the cache based on the timestamp.

10. The method of claim 8 further comprising removing an oldest entry from the cache based on a total amount of entries in the cache.

11. The method of claim 10 further comprising comparing the total number of entries in the cache to a predetermined maximum number.

12. The method of claim 7 wherein the rotating entries comprises placing a second to a most recent added entry in a second location and a least recent entry from entries remaining in the hash bucket in a last location.

13. A method comprising:
   receiving a unique key to be deleted;
   searching a plurality of locations of a hash bucket for a match to the unique key;
   deleting the unique key from a location of the plurality of locations in the hash bucket upon finding the match to the unique key in the location; and
   rotating remaining entries of the hash bucket after the deleting the unique key from the location of the plurality of locations in the hash bucket;
   wherein the searching the cache for the match to the unique key is performed concurrently with the searching the plurality of locations of the hash bucket for the match to the unique key.

14. The method of claim 13 further comprising deleting the unique key from the cache upon finding the match to the unique key in the cache.

15. The method of claim 13 wherein the rotating the remaining entries of the hash bucket comprises shifting entries in locations following a deleted unique key location to place an entry stored in a location next to the deleted unique key location into the deleted unique key location.

16. A method comprising:
   associating an entry of a plurality of entries in a cache with a timestamp;
   incrementing the timestamp; and
   deleting the entry of the plurality of entries in the cache based on a value of the timestamp
   wherein the timestamp is configured to be incremented every second and wrapped around to 0 when the value of the timestamp reaches a predetermined maximum value.

17. The method of claim 16 wherein the deleting the entry of the plurality of entries in the cache is performed upon the timestamp reaching a predetermined maximum value.

18. The method of claim 16 wherein the deleting the entry of the plurality of entries in the cache is performed when the timestamp is greater than timestamps of remaining entries of the plurality of entries and a number of total entries in the cache is equal to a predetermined maximum number of entries.

19. A method comprising:
   identifying a subscriber associated with a particular packet utilizing a line card; and
   transmitting the particular packet to one of a plurality of data cards associated with the identified subscriber;
   wherein the step of identifying comprises identifying the subscriber associated with the particular packet utilizing at least one of the plurality of data cards if the identifying of the subscriber utilizing the line card fails.

20. A method comprising:
   identifying a subscriber associated with a particular packet utilizing a line card; and
   transmitting the particular packet to one of a plurality of data cards associated with the identified subscriber;
   wherein the identifying the subscriber comprises generating a search key from the particular packet unique to the subscriber; and
   concurrently searching a first memory storing most recently used keys and a second memory storing least recently used keys for a matching key.

21. The method of claim 20 further comprising determining an address of the matching key on one of the plurality of data cards.

22. The method of claim 20 wherein the first memory comprises a plurality of buckets comprising a plurality of locations.

23. The method of claim 22 further comprising deleting the matching key from a location in a bucket of the first memory.

24. The method of claim 23 further comprising shifting entries in locations following a deleted matching key location to place an entry stored in a location next to the deleted matching key location into the deleted matching key location.

25. The method of claim 20 further comprising deleting the matching key from the second memory.

26. The method of claim 22 further comprising adding a new key to the first memory by placing a new key in a first location of the plurality of locations in a bucket.

27. The method of claim 26 further comprising rotating entries in remaining locations of the plurality of locations in the bucket to empty the first location of the plurality of locations.

28. The method of claim 27 further comprising moving an entry from a last location of the plurality of locations in the bucket to the second memory.

29. The method of claim 20 further comprising assigning a timestamp to each least recently key in the second memory.

30. The method of claim 29 further comprising deleting a key from the second memory based on the timestamp.

31. The method of claim 30 wherein the deleting the key from the second memory is performed when the timestamp is equal to a predetermined maximum value.

32. The method of claim 30 wherein the deleting the key from the second memory further comprises deleting the key with an oldest timestamp upon a total number of keys in the second memory reaching a predetermined maximum value.

33. An apparatus comprising:
   a hash comprising a bucket with a plurality of locations to store unique keys;
   a cache to store least recently used unique keys; and
   a searching module to receive a unique key and to concurrently search the hash and the cache to find a match to the received unique key from the unique keys stored in the hash and the least recently used unique keys stored in the cache.

34. The apparatus of claim 33 wherein the recently used unique keys in the cache are assigned a timestamp.

35. The apparatus of claim 34 wherein the unique key with an oldest timestamp is removed from the cache.

36. The apparatus of claim 33 wherein a first location in the bucket comprises a most recent key.

37. The apparatus of claim 36 wherein the most recent key is a most recently searched key.

38. The apparatus of claim 36 wherein the most recent key is a last added key.

39. A line card comprising:
   a first memory to store a plurality of most recently used keys;
   a second memory to store a plurality of least recently used keys relative to the most recently used keys; and
   a processor coupled with the first and second memories, the processor to receive a search key and to concurrently search the first and second memories for a matching key among the most recently used keys and the least recently used keys.

40. The line card of claim 39 wherein the first memory is a random access memory.

41. The line card of claim 39 wherein the second memory is a content addressable memory.

42. The line card of claim 39 further comprising a third memory coupled with the processor, the processor to determine an address of the matching key and transmit the address to the third memory.

43. The line card of claim 42 wherein the third memory is configured to store a plurality of different entries.

44. The line card of claim 42 wherein the third memory is a synchronous dynamic random access memory.

45. The line card of claim 43 wherein the search key corresponds to one of the plurality of different entries in the third memory.

46. The line card of claim 39 wherein each least recently used key is assigned a timestamp.

47. The line card of claim 46 wherein a recently used key with an oldest timestamp is removed from the second memory.

48. The line card of claim 39 wherein the first memory comprises a plurality of buckets comprising a plurality of locations.

49. The line card of claim 48 wherein the processor is further configured to add a new key to the first memory.

50. The line card of claim 49 wherein the processor is further configured to add a new key to a first location of the plurality of locations of a bucket.

51. The line card of claim 50 wherein the processor is further configured to rotate entries of remaining locations of the plurality of locations of the bucket.

52. The line card of claim 51 wherein the processor is further configured to move an entry from a last location of the plurality of locations of the bucket to the second memory.

53. The line card of claim 48 wherein the processor is further configured to delete the matching key from the first memory.

54. The line card of claim 53 wherein the processor is further configured to rotate entries in remaining locations of the plurality of locations of a bucket.

55. The line card of claim 54 wherein the processor is further configured to the rotate the entries in the remaining locations of the bucket by shifting entries in locations following a deleted matching key location to place an entry stored in a location next to the deleted matching key location into the deleted matching key location.

56. An apparatus comprising:
 means for receiving a unique key;
 means for searching a hash for a match to the unique key;
 means for searching a cache for the match to the unique key concurrently with searching the hash for the match to the unique key; and
 means for obtaining information regarding the unique key;
wherein the cache comprises least recently used keys.

57. The apparatus of claim 56 wherein the hash comprises buckets, each bucket comprising a plurality of locations.

58. The apparatus of claim 57 wherein a first location in the bucket comprises a most recent key.

59. A machine-readable medium that provides instructions, which when executed by a machine, cause the machine to perform operations comprising:
 receiving a unique key;
 searching a hash for a match to the unique key;
 searching a cache for the match to the unique key concurrently with the searching the hash for the match to the unique key; and
obtaining information regarding the unique key;
wherein the cache comprises least recently used keys.

60. The machine-readable medium of claim 59 wherein the hash comprises a plurality of buckets, each bucket comprising a plurality of locations.

61. The machine-readable medium of claim 60 wherein a first location in the bucket comprises a most recent key.

62. A machine-readable medium that provides instructions, which when executed by a machine, cause the machine to perform operations comprising:
 rotating entries stored in a plurality of locations of a hash bucket to empty a first location;
 adding a key to the first location of the plurality of locations of the hash bucket; and
 moving an entry from a last location to a cache;
wherein the rotating entries comprises moving an entry from a location to a next location.

* * * * *